US007945601B2

(12) United States Patent
Pallari et al.

(10) Patent No.: US 7,945,601 B2
(45) Date of Patent: May 17, 2011

(54) REPORTING OF APPROVAL WORKFLOW TRANSACTIONS USING XMLP

(75) Inventors: Vincent Francis Pallari, Folsom, CA (US); Robbin Velayedam, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 380 days.

(21) Appl. No.: 12/108,231

(22) Filed: Apr. 23, 2008

(65) Prior Publication Data

US 2009/0070365 A1    Mar. 12, 2009

Related U.S. Application Data

(60) Provisional application No. 60/970,448, filed on Sep. 6, 2007.

(51) Int. Cl.
*F06E 17/044* (2006.01)
(52) U.S. Cl. ........ 707/805; 707/809; 707/804; 707/807; 707/803; 707/802
(58) Field of Classification Search ................... 707/722, 707/805
See application file for complete search history.

(56) References Cited

U.S. PATENT DOCUMENTS

| | | | | |
|---|---|---|---|---|
| 2003/0229522 A1* | 12/2003 | Thompson et al. | ................ | 705/4 |
| 2005/0010859 A1* | 1/2005 | McDonough et al. | ........ | 715/500 |
| 2005/0246629 A1* | 11/2005 | Hu | ............................... | 715/513 |
| 2005/0273365 A1* | 12/2005 | Baumgartner et al. | ........... | 705/3 |
| 2006/0020886 A1* | 1/2006 | Agrawal et al. | ................ | 715/530 |
| 2007/0192679 A1* | 8/2007 | Foushee et al. | ................ | 715/506 |
| 2008/0046568 A1* | 2/2008 | Broda et al. | ................... | 709/227 |
| 2008/0046803 A1* | 2/2008 | Beauchamp et al. | ......... | 715/212 |
| 2009/0063240 A1 | 3/2009 | Pallari et al. | | |
| 2009/0064280 A1 | 3/2009 | Babeanu et al. | | |
| 2009/0132996 A1* | 5/2009 | Eldridge et al. | .............. | 717/108 |
| 2010/0106546 A1* | 4/2010 | Sproule | ............................ | 705/7 |

OTHER PUBLICATIONS

"Oracle XML Publisher—User's Guide Release 11/", Feb. 2006, Oracle.*

* cited by examiner

*Primary Examiner* — Charles Kim
*Assistant Examiner* — Sheryl Holland
(74) *Attorney, Agent, or Firm* — Kilpatrick Townsend & Stockton LLP

(57) ABSTRACT

Embodiments described in the application provide for reports that are generated in many different formats using an Approval Workflow Engine (AWE) and an XML Publisher (XMLP) component. The AWE can accept user parameters to extract data from at least one data source, transform the data, and generate a structured XML data file appropriate for the report. The AWE can pass this XML file, along with at least one report template and other necessary information to the XMLP, which is able to generate reports in any of a number of specified formats. Such an approach keeps the data separate from the formats and components, and allows for multiple reports to be generated without accessing an application for each format. The AWE also can store an audit history record for each transaction passing through the AWE in order to provide a concise location from which to retrieve the information.

18 Claims, 9 Drawing Sheets

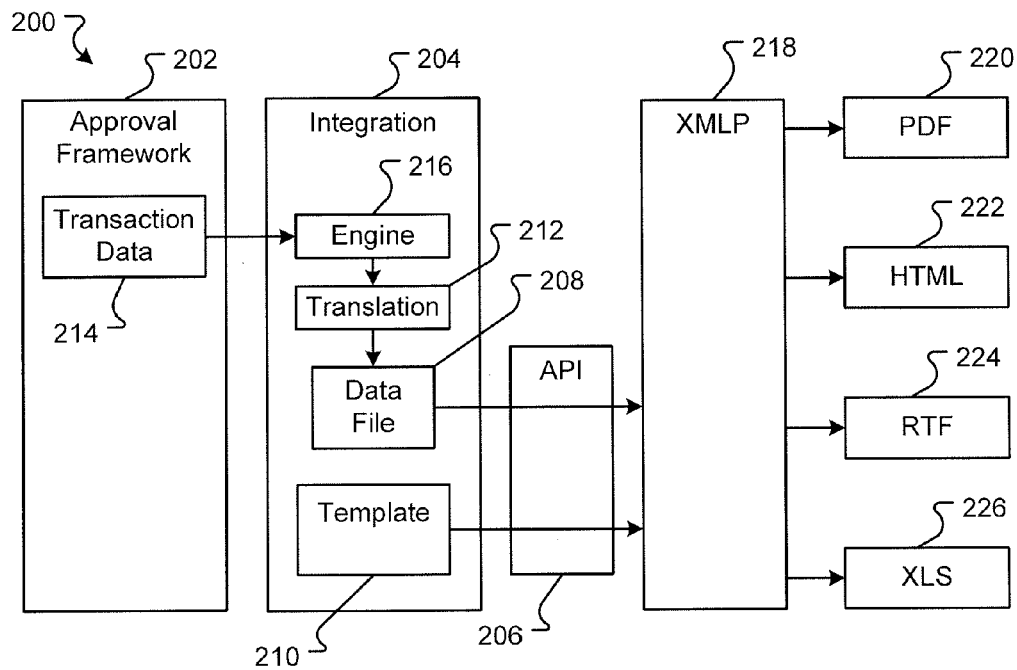

FIG. 2

| Process ID: AbsenceManagement | Definition ID: Absence_Mgnt_BySupervisorId |
|---|---|
| Transaction Originator | HAM-K0W007 |
| Originator Name | James Jones |
| Overall Transaction Status | Approved |
| Last Updated On | 06/06/2007 @ 15:46PM |

| Stage Number: 10  Path Number: 1  Step Number: 1 | | | | |
|---|---|---|---|---|
| Step Type | N - Normal | | | |
| Step Status | Approved | | | |
| Approver | Approved By | User Type | Step Stat | Completed On |
| HAM K0W006 | HAM K0W006 | Approver | Approved | 06/03/2007 @ 12:34PM |

| Stage Number: 10  Path Number: 1  Step Number: 2 | | | | |
|---|---|---|---|---|
| Step Type | Normal | | | |
| Step Status | Approved | | | |
| Approver | Approved By | User Type | Step Stat | Completed On |
| HAM_K0W003 | HAM_K0W003 | Approver | Approved | 06/05/2007 @ 07:30AM |
| HAM K0W012 | HAM K0W012 | Ad Hoc Approver | Bypassed | 06/06/2007 @ 15:46PM |

FIG. 3

| Data Source | 404 | | 400 |
|---|---|---|---|
| | ⌐402 | | |
| Data Source Type: | XML File | | |
| Data Source ID: | HCSC_AWE_ADT_FILE | | |
| Data Source Properties | | | |
| Description: | AWE Audit by File | | ☑ Active |
| Object Owner ID: | HCM Shared Componen ▼ | | |
| Registered Date/Time: | 03/21/06 4:16:26PM | Requested By: | PS |
| Last Update Date/Time: | 03/29/06 7:58:00AM | Updated By: | PPLSOFT |
| Related Files | | | |
| File Type | File | | Upload File |
| Sample Data File | HCM_AWE_AUDIT_XML.xml | | Upload |
| Schema File | HCM_AWE_AUDIT_XML.xsd | | Upload |

[Return to Search] [Previous in List] [Next in List] [Add] [Update/Display]

FIG. 4

| Definition | Template | Output | Security | Bursting | 500 |
|---|---|---|---|---|---|
| Report Name: | AWEAUDIT2 | | | | |

Data Source

| Data Source Type: | XML File |
|---|---|
| Data Source ID: | HCSC_AWE_ADT_FILE |
| Data Source Description: | AWE Audit by File |

Report Properties

| Report Description: | AWE Audit Report | ⌐502 | | |
|---|---|---|---|---|
| *Report Status: | Active ▼ | ⌐504 | | |
| *Report Category ID: | ALLUSER | All People Soft User | | |
| Object Owner ID: | People Tools ▼ | | | |
| Template Type: | ○ PDF | ⦿ RTF | ○ eText | ○ XSL |
| Days Before Purge: | 100 | | | |
| Registered Date/Time: | 03/21/2006 4:21:52PM | Registered By: | PS | |
| Updated Date/Time: | 04/12/2006 7:55:21AM | Updated By: | PPLSOFT | |
| Download: | Data Schema | Sample Data | | |

[Return to Search] [Previous in List] [Next in List] [Add] [Update/Display] [Include History] [Correct History]

FIG. 5

| Definition | Template | Output | Security | Bursting | 600 |

Report Name: AWEAUDIT2

Template      Find | View All    First ◀ 1 of 1 ▶ Last

Template ID: ↙602 AWEAUDIT2_1    ⊞ Default Template

Description: Template for file ↙604

*Language Code: English ▾    Channel: Web posting ▾

Template Files

Effective Date: 01/01/1900

*Status: Active ▾

Template File: HCSC_AWE_AUDIT.rtf    [Upload] [Download] [Preview]

[Return to Search] [Previous in List] [Next in List] [Add] [Update/Display] [Include History] [Correct History]

| Definition | Template | Output | Security | Bursting | 700 |

Report Name: AWEAUDIT2

General

☑ PDF report output may be edited

Runtime Output Format Options

| Format Type | Enabled | Default |
|---|---|---|
| HTML | ☑ | ☐ |
| PDF    702 ↗ | ☑ | ☐ |
| RTF | ☑ | ☑ |
| XLS | ☑ | ☐ |

Output Location

*Location: Web ▾    Report Manager Folder Name: GENERAL 🔍

[Return to Search] [Previous in List] [Next in List] [Add] [Update/Display] [Include History] [Correct History]

[Save]

| Definition | Template | Output | Security | Bursting | 800 |

Report Name: AWEAUDIT2

Report Viewers:

☑ Allow viewer ID assignment at report runtime

Report Viewers:      View All   First ◀ 1-2 of 2 ▶ Last

| ID Type | Distribution ID | Description | | |
|---|---|---|---|---|
| User ▼ | PS 🔍 | [PS] Peoplesoft Superuser | + | − |
| Role ▼ | AWE Administrator 🔍 | AWE Administrator | + | − |

802

🔍 Return to Search   ⬆ Previous in List   ⬇ Next in List   ➕ Add   📝 Update/Display   📄 Include History   📄 Correct History

FIG. 9

| Definition | Template | Output | Security | Bursting | 900 |

Report Name: AWEAUDIT2    ⌐902

Bursting

Burst by:    ORIGINATORID ▼

Template

Template controlled by:    COMMENTS ▼

Template Application Criteria

| *Data Value | *Template ID | Language | | |
|---|---|---|---|---|
| | ▼ | ▼ | + | − |

Burst Security

Security Join Table: [ 🔍 ]
Security Field: [ ▼ ]    Security ID Type: [ ▼ ]

Field Mapping

| Security Join Table Field | Data Source Field |
|---|---|
| ▼ | ▼ |

Search Keys

| Search Field | | |
|---|---|---|
| ▼ | + | − |

REPORTING OF APPROVAL WORKFLOW TRANSACTIONS USING XMLP

CROSS-REFERENCE TO RELATED APPLICATIONS

This application is related to U.S. patent application Ser. No. 11/847,686, filed Aug. 30, 2007, entitled "ROUTING TRANSACTIONS IN A MULTIPLE JOB ENVIRONMENT USING AN APPROVAL FRAMEWORK.", and U.S. Patent Application No. 60/970,217, filed Sep. 5, 2007, entitled "SYSTEMS AND METHODS FOR DELEGATING ROLES IN TRANSACTIONAL SYSTEMS," each of which is hereby incorporated by reference for all that they teach. This application is also related to and claims benefit and priority as a non-provisional application from U.S. Provisional Patent Application No. 60/970,448 filed Sep. 6, 2007, entitled "TRANSACTION REPORTING USING AN APPROVAL WORKFLOW ENGINE", and is hereby incorporated by reference for all that it teaches.

COPYRIGHT NOTICE

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND

The present invention relates generally to managing transactions and transaction data, and more particularly to generating reports for human resource-related transactions in an enterprise environment.

As organizations continue to move to paperless systems, the complexity of managing transactions electronically within an organization increases accordingly. Complex workflows are needed to provide the functionality needed to process all the variations of a transaction in a number of different situations. For example, an employee might submit a transaction that requires approval from at least one manager, supervisor, or other appropriate person. The approval process might then have several steps, which occur at different times, and may include a number of different details. Further, multiple people may approve, deny, or otherwise touch the transaction, and some of these people might designate another person(s) to act on their behalf. A user might also have multiple jobs, such that different managers approve transactions for different jobs or roles of the user. The amount of data and the rules and context needed to interpret this data make reporting on, and analyzing this data, increasingly difficult.

Many existing systems simply store at least a portion of this data in at least one data repository. In order to generate a report, a user typically must generate and execute multiple queries to obtain the appropriate data for the report. Further, some data is stored in code form (such as "A" for approved or "D" for denied) which must be translated by the user in order to be of use to someone analyzing the report, and further for the user to know how to interpret and utilize the data.

Further complicating the matter is that reports typically are run in multiple formats. When generating forms for the government, a PDF file often is generated, while a finance department might want the data in a spreadsheet format, and payroll might want the data in a rich text format. Executives or managers in the company might prefer HTML reports that they can quickly access online. Generally, the user separately generates each of these reports in each of the necessary formats. When generating a spreadsheet-based report, for example, a user not only has to set up the report format and configuration, and use macros or generate code to do any necessary translation, but also typically has to query and import the data into the spreadsheet application to run the report. When several different reports need to be run for a large amount of data for an entire organization, this process is slow, costly, and inefficient, and has several opportunities for error.

It is with respect to these and other considerations that this patent application is presented.

SUMMARY

It is desirable to provide an approach that simplifies and provides enhanced reporting for a number of different formats in a transactional system. Embodiments of systems and methods, presented herein, can overcome the aforementioned and other deficiencies in existing transaction management systems by providing for the generation of reports in multiple formats utilizing a data file in a template-based approach. In embodiments, an XML data file and a document-based template are passed to a publishing component that is able to use the data file and template to generate reports in a number of different formats. The data file is, in embodiments, an abstraction of one or more databases allowing the publishing component to use the data without having to make queries or other calls to the database. In embodiments, the template file is a user-created representation of the report. The publishing component combines the template with the data from the data file to form the report.

The publishing component, in embodiments, outputs the report into at least one of multiple formats. The output data from the publishing component does not have to be passed into any of the programs typically associated with the output formats, and the user does not have to manually format, configure, or generate the reports. Further, the novel reporting system provides the logic needed to arrange the reports by group, department, employee, or any other appropriate delineation.

This Summary is provided as exemplary only and is not meant to limit the scope of the invention in any manner. The invention is as recited in the claims.

BRIEF DESCRIPTION OF THE DRAWINGS

Various embodiments will be described with reference to the drawings, in which:

FIG. 2 is a block diagram of an embodiment of a system for generating reports for an organization;

FIG. 3 is an example of a report template for inputting information into the reporting system;

FIG. 4 is an embodiment of an interface for the reporting system;

FIG. 5 is another embodiment of an interface for the reporting system;

FIG. 6 is another embodiment of an interface for the reporting system;

FIG. 7 is another embodiment of an interface for the reporting system;

FIG. 8 is another embodiment of an interface for the reporting system;

FIG. 9 is another embodiment of an interface for the reporting system;

DETAILED DESCRIPTION

Embodiments described herein provide for a structured approach to reporting information. In embodiments, an XML data file and a document-based template are created. The data file and template are imported to a publishing component. The publishing component can generate the report using the data file and template. In embodiments, the publishing component publishes the report in one of several predefined formats. In further embodiments, the publishing component includes logic to associate the requested reports with some parameter. For example, the report is associated with a group, a department, an employee, a business unit, etc.

The embodiments provided can be used with a human relations transaction system that includes business processes (e.g., an approval process) wherein transactions are routed for approval within an organization. An exemplary transaction management system is PeopleSoft Human Capital Management (HCM) available from Oracle Corporation of Redwood Shores, Calif., which is an application for performing human resources-related functions, for example, tracking employee and job information. While described with respect to the approval of transactions and other functionality for human resources systems, it should be understood that such implementation is merely exemplary and that functionality and advantages of the various embodiments can be used with other systems and applications as well.

Figure 1:
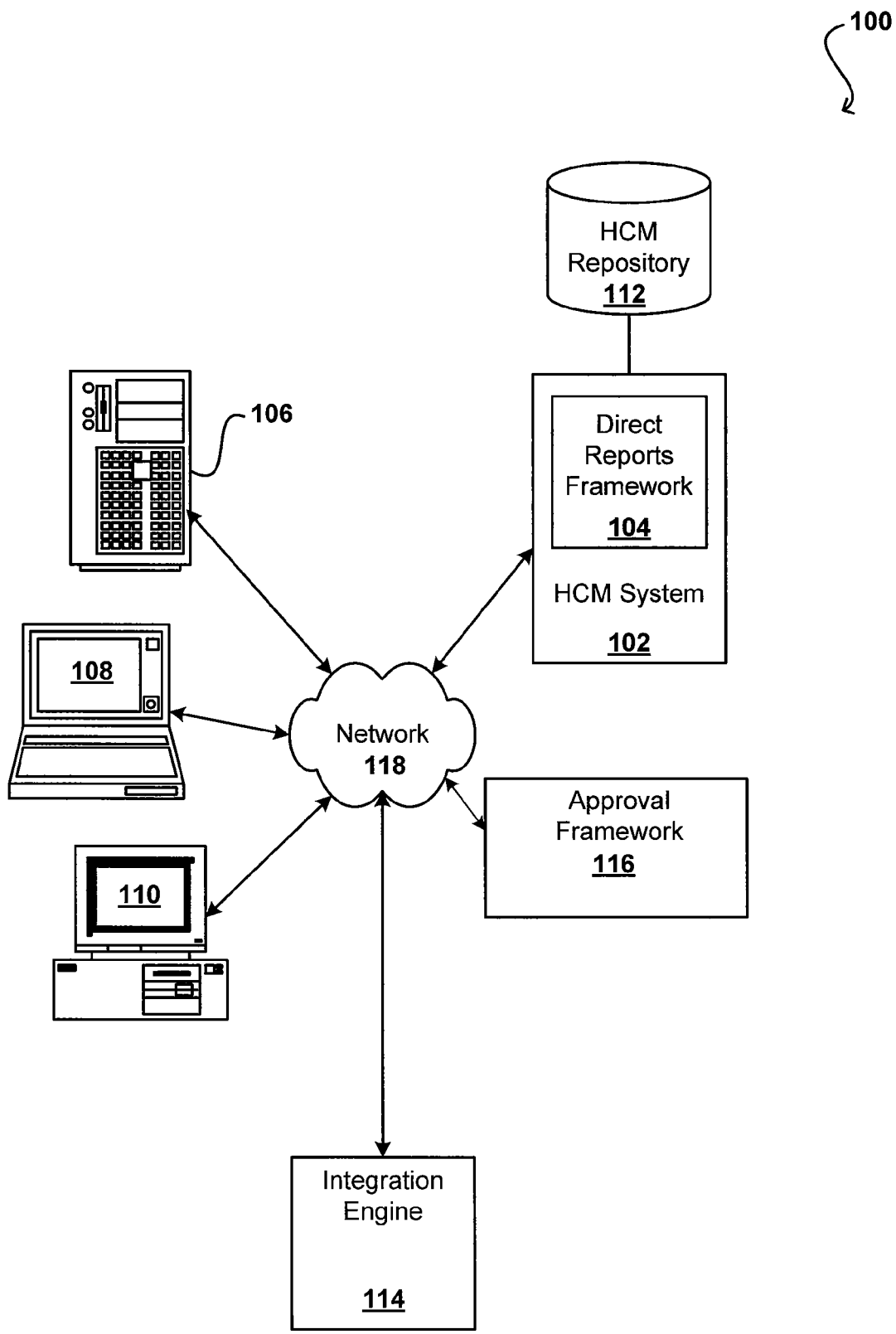
FIG. 1 is a block diagram of an embodiment of a system for managing transactions in an organization.

An embodiment of a transaction system 100 for generating reports is shown in FIG. 1. In embodiments, an employee transaction can be submitted by the employee through, for example, a laptop 108 or desktop computer 110, or submitted via a server 106 from a transaction application, where the transaction passes through an appropriate network 118 and is received by the HCM system 102. The network, in embodiments, is a local area network (LAN), a wide area network (WAN), the Internet, or other network.

An HCM system 102 is hardware, software, or hardware and software for processing transactions. An HCM system 102 stores information in an HCM repository 112. The HCM repository 112 is a database or other storage system that may be stored on a computer-readable medium. The HCM system 102 can also include a Direct Reports framework 104. In embodiments, the Direct Reports framework 104 includes functionality for determining organizational relationships. In one example, a Direct Reports framework 104 allows customers or organizations to define employee/manager relationships from HCM system 102 to access types such as Supervisor, Department, Position, Partial-Position-Supervisor, and Partial-Position-Department. The HCM system 102, in embodiments, includes a Direct Reports interface (not shown). The Direct Reports interface can be a common API capable of encapsulating common logic for determining direct reports, which is able to determine direct reports for a given employee or to determine the person or entity to which an employee or job directly reports.

In embodiments, the exemplary HCM system 100 also interfaces with an Approval Framework 116. The Approval Framework 116, in embodiments, is a common framework that is independent of the HCM system 102. The Approval Framework 116 is hardware, software, or hardware and software for supporting the approval of transaction and for hosting many applications including and in addition to the HCM system 102. The Approval Framework 116 can be used to define and route transactions that require approvals. The Approval Framework 116 can interface with an engine 114 (which may be referred to as an approval workflow engine "AWE") that provides the capability and framework for creating, running, and managing approval processes. In embodiments, the engine 114 is a component of the approval framework 116. It alternative embodiments, the engine 114 is a separate component.

The engine 114 can use a series of database objects combined with application component configuration settings to determine how to process approvals using workflows. Approval workflows are triggered when requesters submit a transaction. The application passes the transaction over to the engine 114, which finds the appropriate approval process definition and launches the approval workflow. A set of approvers then carry out tasks related to the transaction.

The engine 114 allows multiple levels of users to develop, configure, and use transaction approvals that meet organizational requirements. In order to provide such functionality to an application, the application must implement or integrate the Approval Framework 116 in order to leverage the functionality. A "power user" or implementer registers the application with the engine 114. The registration requires the implementer to define or describe the application components, event handler, and records, for example. The implementer can also create a record and table in which to store cross-reference information and set-up notification templates for events. In embodiments, an Approval Process Definition is defined by an implementer to include items such as stages, paths, steps, varying hierarchies, and criteria, among other configurable parameters, which determine how the engine 114 will manage the approval. The registration allows the Approval Framework 116 to understand how to respond to an approval request from the application. Thereinafter, the application, in embodiments, makes calls into the Approval Framework 116.

When a user submits a transaction for approval, the submission action launches the approval process. In embodiments, the engine 114 reads an approval process definition and queues the transaction for approval. Each Approval Process Definition includes a process identifier (ID) that is registered with the engine 114. The engine 114 allows a user to escalate an approval when not getting feedback, and reassign approval tasks to another user or a proxy. The engine 114 can generate a worklist and email notifications for any processed or requested approval so that there is a well-documented path including information for each step of the approval process. The documentation path information can be used to provide a detailed description of approval transactions that have passed through the engine 114. The document path information, in embodiments, includes every step within the approval process, date/time stamps, originator, approver, proxy, proxies, and transaction details, and any other field that the engine 114 is tracking for a transaction. Such a customizable tool can help with auditing and Sarbanes-Oxley compliance, for example.

In embodiments, a system 200, such as that described in conjunction with FIG. 1, that provides an audit history report using the engine, or AWE, and Approval Framework is shown in FIG. 2. In embodiments, the system includes an Integration Component 204, which may be the same or similar to engine 114 (FIG. 1), and an Approval Framework 202, which may be the same or similar to Approval Framework 116 (FIG. 1). The Approval Framework 202, and more specifically, the Integration Component 204, can generate a data file 208 and a template 210. The data file 208, in one embodiment, is an XML data file generated from any appropriate data source. In embodiments, the user executes a report by calling the engine 216 of the Integration Component 204.

In embodiments, the templates 210 are the generic structure of the documents to be produced. The template 210, in embodiments, is a document-based template, for example, a document from Microsoft Word® available from Microsoft Corporation of Redmond, Wash. In embodiments, an implementer inputs information to generate the template 210 and information describing the data file 208. The input from the implementers for a report definition can be associated with many templates 210, for example, by associating a template identifier with the report definition. A user can use preview or sample data with the template 210 to see how the report will ultimately appear, and the user can edit the template 210 as needed.

The engine 216 can also generate, from user input, a translation file 212 that includes translations (e.g., real-world meanings) for each of the codes used in the data for the report. For example, the code "CEO" means "Chief Executive Officer." The translation file 212, data file 208, and template 210 can be created for multiple approvals. Thus, the engine 216 may store the translation file 212, data file 208, and template 210 and extract the translation file 212, data file 208, and template 210 when needed for an approval process. An identifier or other nomenclature may be used to associate the translation file 212, data file 208, and template 210 with the approval needed. The application can request an approval and provide the identifier for the translation file 212, data file 208, and template 210 to allow the engine 216 to extract the translation file 212, data file 208, and template 210 from a data store.

The engine 216, in embodiments, receives transaction data 214 from the Approval Framework 202. The engine 216 can translate the transaction data 214 with the translation file 212 to create the data file 208. In embodiments, the engine 216 also creates or retrieves the template 210. The engine 216 may then call a XML Publisher ("XMLP") component 218. The engine 216, in embodiments, passes the data file 208 and the template 210 to the XMLP 218 through an appropriate interface 206 (here an Approval Framework application programming interface (API) 206) to a publishing component 214. In embodiments, the publishing component 218 is the XMLP available from Oracle Corporation of Redwood Shores, Calif. The XMLP component 218 is able to accept the inputs from the engine 216 and generate reports in many different formats, as specified by the request initiating the report(s).

In embodiments, the XMLP 218 generates one or more reports 220, 222, 224, and/or 226. Each of the reports are in a different format. For example, report 220 is a PDF file, report 222 is a web page in HTML, report 224 is an text document in RTF format, and report 226 is a spreadsheet in XLS. XMLP 218 allows a user to create many different types of forms, invoices, checks, reports, etc. that a customer might need, without having to use a number of different tools to define, manage, and deliver the report in different formats. Without XMLP 218, a user might have to use separate spreadsheet, document image creation, check generation, and other such applications all for a single report.

In embodiments, an exemplary report 300 is shown in FIG. 3. The report 300 can be the same or similar to one of the reports 220, 222, 224, and/or 226 (FIG. 2) that are generated as an audit history report with the system 200 of FIG. 2. In embodiments, the report 300 is customizable by changing the template 210 (FIG. 2). A user can determine which fields to include and can determine how to arrange and format the fields. As shown, the report template 300 can include information such as an overview of process, who originated the transaction, etc. The report 300 provides an audit trail of the entire transaction.

XMLP is advantageous as it allows for the separation of the data from the actual layout and from the actual user interface ("UI"). In prior approaches, if a user was generating a spreadsheet-based report, then the user would typically have to import the data into the spreadsheet application. Using XMLP 218, the data can be separate regardless of the ultimate format(s) to be used. By keeping the data separate, a user can manage the data without affecting the various UIs.

A series of screenshots is shown in FIGS. 4-9 showing the generation of the XML data file with the engine 216 (FIG. 2), or AWE. As discussed above, these screens act as a UI for the Approval Framework and AWE to generate the report (for example, the report shown in FIG. 3). FIG. 4 shows an interface page 400 wherein the user selects the data source to be used for the report. The user can locate the data source using information such as data source type 404 and data source ID 402. In embodiments, a user selects the data source ID to begin the data file generation process.

In embodiments, a user selects the report to be generated from the exemplary page 500 shown in FIG. 5. For example, the user selects an Audit Report in text box 502. Further, the user has selected to run the report for all active users as shown in text box 504. In embodiments, selecting the report allows the engine 216 (FIG. 2) determine the report template to use in generating the report. In an alternative embodiment, the user selects the template as shown in the page 600 shown in FIG. 6. In the exemplary page 600, the user selected a template shown by template ID 602. In embodiments, this is the default template for the report chosen, as evidenced by the check box 604. The template may be a Microsoft Word® template, as discussed in conjunction with FIG. 2. In embodiments, a user may also select the translation file 212 (FIG. 2).

A user may also select formats for the report as shown in page 700 of FIG. 7. For example, the user selects the output choices using check boxes 702. In the exemplary page 700, four formats are shown (HTML, PDF, RTF, and XLS), but there can be any number of types and any combination can be made available, as may be specified by an administrator. In embodiments, the user can also specify the security type or level for the report. For example, the user can use page 800, shown in FIG. 8, to specify who is allowed to view or access the report. The user, in this example, defines the role or user type of the person(s) able to view the report by selecting the user type in drop down menu 802. In further embodiments, the user may also select delivery options for the report. The user can, for example, specify segmenting or "bursting" of the report using page 900 shown in FIG. 9. From a functional standpoint, customers may wish to break reports into separate files due to size limitations, data security, etc. Bursting allows a user to break the report up into manageable pieces, which can be delivered to different groups, presented as different parts of a single report format, or be presented in different formats. Users thus can segregate these reports as desired by choosing a parameter, in drop down menu 902, by which to burst. In an example where a user is printing paychecks, the end result is preferably a separate document (or "report") for each employee, whereby the user can select to burst on the employee ID in order to generate a separate document for each employee rather than one long document including every paycheck.

Figure 10:
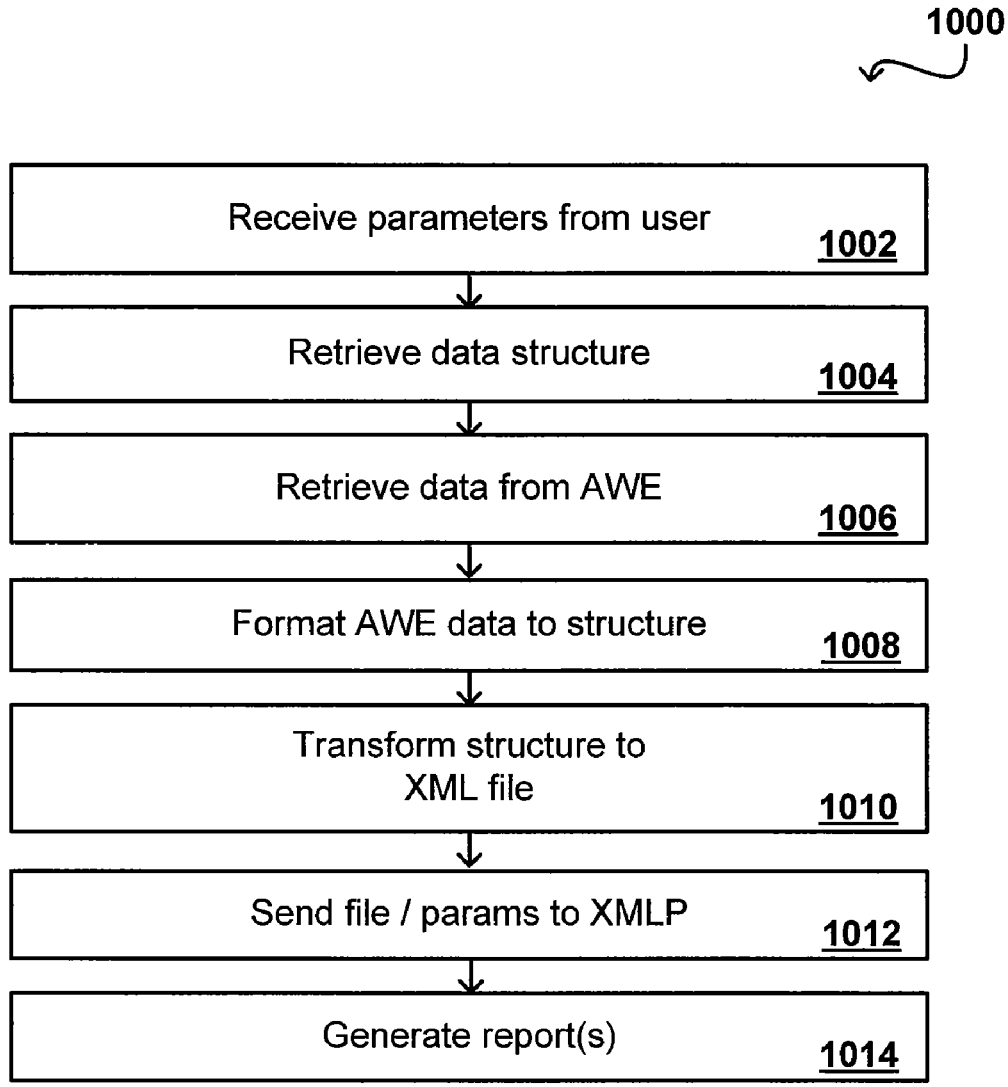
FIG. 10 is a flow diagram of a method for generating a report.

An embodiment of a method 1000 for generating a report is shown in FIG. 10. In embodiments, the method 1000 may be stored on a computer-readable medium and performed by a computer system as a set of computer-executable instructions. The method 1000 illustrates the collecting of data and the generating of information needed by the XMLP component to generate the reports.

Receive operation 1002 receives parameters for a user. In embodiments, the engine 216 (FIG. 2) retrieves customer input parameters from a Run Control UI on a computer system 108, 110, or 106 (FIG. 1). The engine 216 (FIG. 2) can determine the parameters to be used to generate the report from the input parameters. For example, a user may wish to examine all transactions within a HCM system that have been submitted after a predetermined date and before a different predetermined date. In another example, the user also may wish to look at a specific approval process ID, which could include all promotions that occurred this year. A user also can submit options such as filtering by requester, or analyzing all transactions that are still pending.

Figure 11:
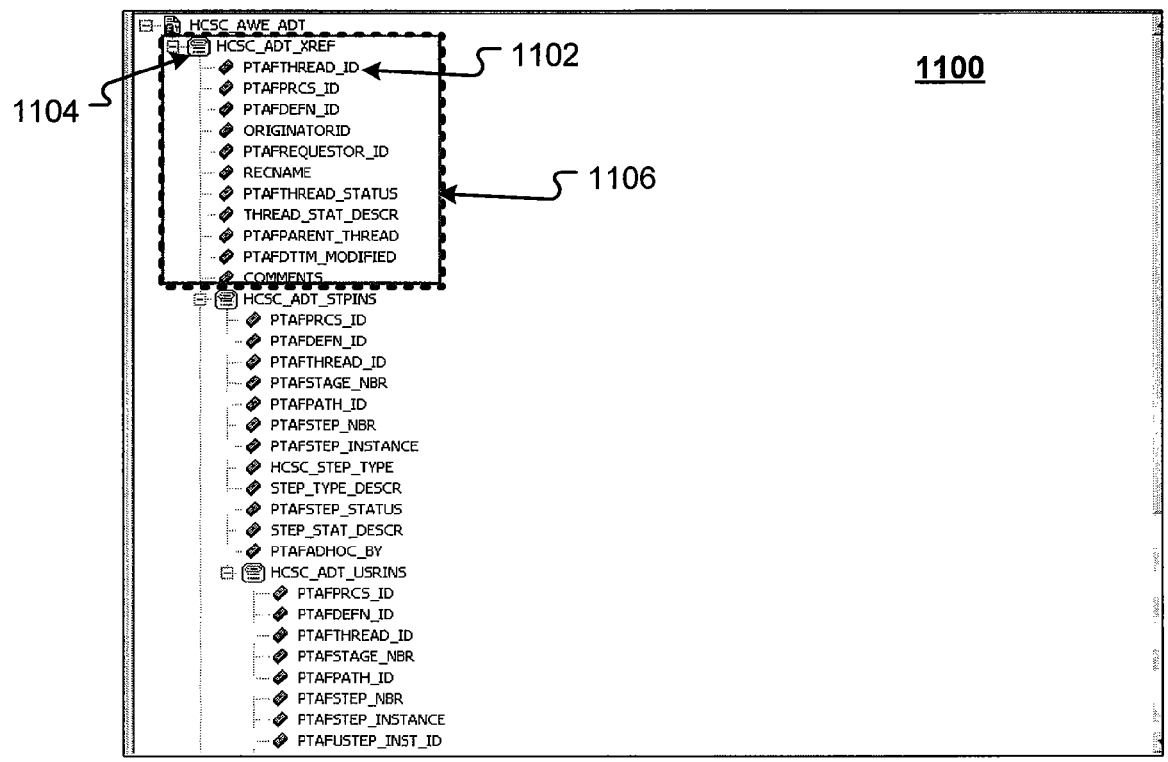
FIG. 11 is an example of a data structure used for input into the reporting process.

Retrieve operation 1004 retrieves a data structure. Once these parameters are received, the engine 216 (FIG. 2) can retrieve the data structure from an appropriate location. The data structure is the representation of the data format required by the XMLP. In embodiments, the engine 216 (FIG. 2) retrieves the data structure from a FileLayout component. An exemplary data structure definition 1100 is shown in FIG. 11. The data structure definition 1100, in embodiments, indicates how the data should be structured at runtime. This data structure definition 1100 example includes database symbols 1102 to indicate data records and rectangles 1104 for fields in order to define the record hierarchy. Such a data structure definition 1100 can be created and then called at runtime to help structure the data.

Retrieve operation 1006 retrieves data. In embodiments, the engine 216 (FIG. 2) retrieves the data. In alternative embodiments, the approval framework 202 (FIG. 2) retrieves the data and sends the data to the engine 216 (FIG. 2). Referring again to FIG. 11, a box 1106 around the record HCSC_ADT_XREF in the data structure definition 1100 defines the data to be retrieved. This record HCSC_ADT_XREF corresponds to a high level tracking record, wherein every transaction that gets submitted within HCM results in a row being written to a table for purposes of the audit report. The table provides a small, local collection of one or more transactions that have passed through the engine 216 (FIG. 2) for HCM.

Format operation 1008 formats the data to the structure. The engine 216 (FIG. 2), in embodiments, formats the retrieved data according to the retrieved data structure. The parameters provided to or generated by the engine 216 (FIG. 2) are used to write a subset of the data in memory from the XREF record 1100 (shown in FIG. 11) in the format of the file layout structure. The parameters are used to query the audit reporting record to retrieve the rows that match the user parameters, and the rows from that record can be written line by line and level by level into the data structure in that file layout. A data structure is thus created, in memory, that has a predetermined structure based on the data structure layout that is passed to the XMLP. In embodiments, the data structure is in the XML format.

During the formatting process of the data structure, the engine 216 (FIG. 2) can use the translation file 212 (FIG. 2) to translate data codes in the data. The translation of the data codes ensures the data in the data structure has useful text. Further, the engine 216 (FIG. 2) can parse comments or similar fields to associate those comments to predetermined actions, items, or times in the report. The engine 216 (FIG. 2) can also perform functions such as converting any date/time stamps to localized date/time formats.

Transform operation 1010 transforms the data structure into an XML file. The engine 216 (FIG. 2) can execute a single command that modifies the data structure in memory and writes customer-legible data to a physical file on the application server. Send operation 1012 sends the XML file and parameters to the publishing component. In embodiments, the engine 216 (FIG. 2) sends the XML file and parameters to the XMLP 218 (FIG. 2). In embodiments, the engine 216 (FIG. 2) passes the XML file via a series of commands through an API 206 (FIG. 2). The engine 216 (FIG. 2) can also pass the request for which report(s) are to be generated and which template(s) are to be used.

Generate operation 1014 generates the report(s). The engine 216 (FIG. 2), in embodiments, sends another command to the XMLP API 206 (FIG. 2) to indicate that the XMLP 218 (FIG. 2) should generate the report 220, 222, 224, and/or 226 (FIG. 2). In embodiments, the engine 216 (FIG. 2) waits for the data and parameters to be passed to the XMLP 218 (FIG. 2) before issuing the command to generate the report. The engine 216 (FIG. 2), in alternative embodiments, also issues a command to publish the report to a report repository.

Figure 12:
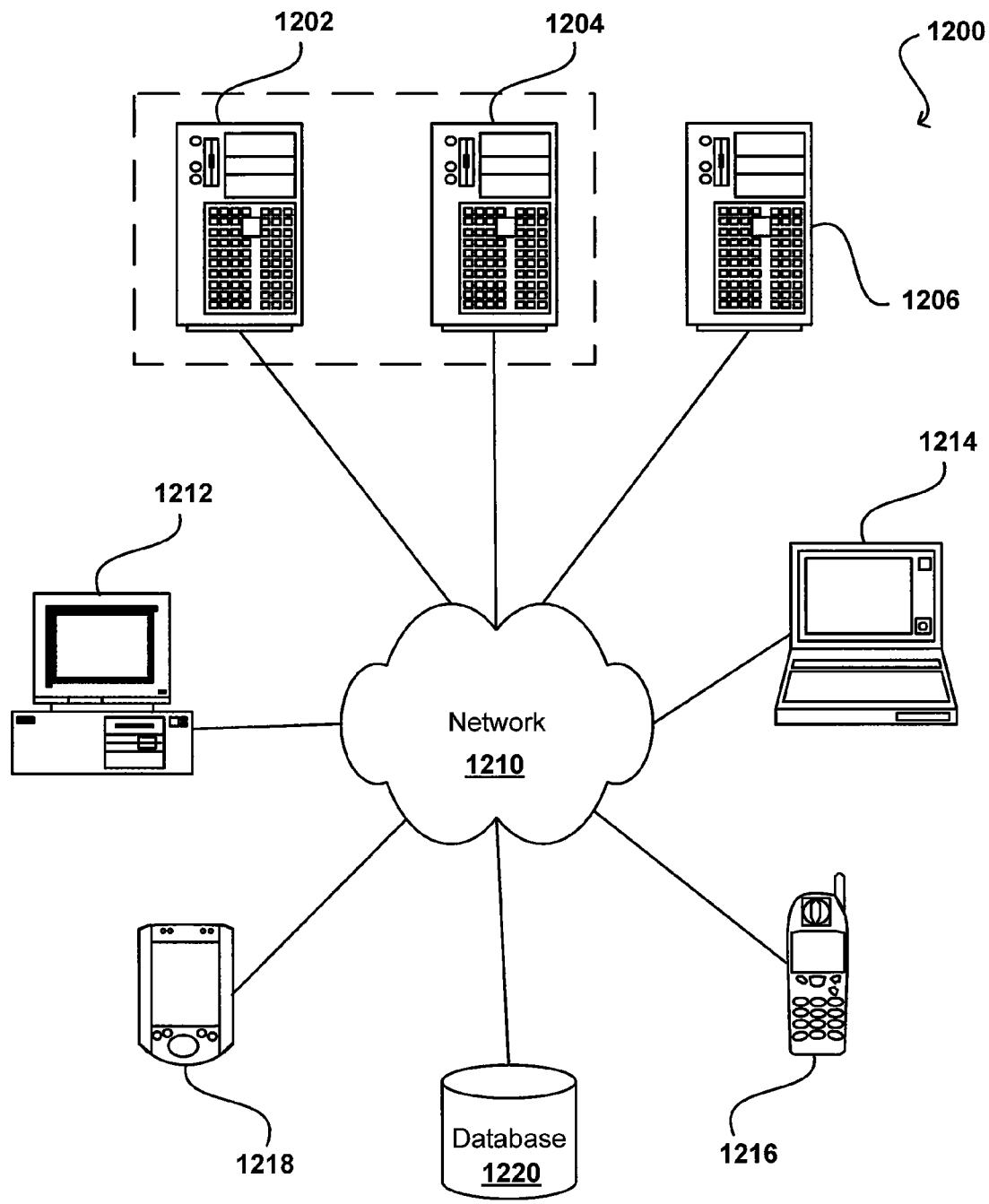
FIG. 12 is a block diagram of an embodiment of an operating environment of the reporting system.

A block diagram illustrating components of an exemplary operating environment 1200 is shown in FIG. 12. The various embodiments described herein may be implemented in the exemplary operating system 1200. The system 1200 can include one or more user computers, computing devices, or processing devices 1212, 1214, 1216, 1218, which can be used to operate a client, such as a dedicated application, web browser, etc. For example, the client may be an application that is linked to the approval framework 202 (FIG. 2). The user computers 1212, 1214, 1216, 1218 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1212, 1214, 1216, 1218 may also have any of a variety of applications, including one or more development systems, database client and/or server applications, and Web browser applications. Alternatively, the user computers 1212, 1214, 1216, 1218 may be any other electronic device, such as a thin-client computer, Internet-enabled gaming system, and/or personal messaging device, capable of communicating via a network (e.g., the network 1210 described below) and/or displaying and navigating Web pages or other types of electronic documents. Although the exemplary system 1200 is shown with four user computers, any number of user computers may be supported.

In most embodiments, the system 1200 includes some type of network 1210. In embodiments, the network 1210 is the same or similar to network 118 (FIG. 1). The network may be any type of network familiar to those skilled in the art that can support data communications using any of a variety of commercially-available protocols, including without limitation TCP/IP, SNA, IPX, AppleTalk, and the like. Merely by way of example, the network 1210 can be a local area network ("LAN"), such as an Ethernet network, a Token-Ring network and/or the like; a wide-area network ("WAN"); a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi™, CDMA 2000, WCDMA, the Bluetooth protocol known in the art, and/or any other wireless protocol); and/or any combination of these and/or other networks.

The system may also include one or more server computers 1202, 1204, 1206 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. The server computers 1202, 1204, 1206 function to execute the approval framework 116 (FIG. 1), HCM system 102 (FIG. 1), or other applications. One or more of the servers (e.g., 1206) may be dedicated to running applications, such as a business application, a Web server, application server, etc. Such servers may be used to process requests from user computers 1212, 1214, 1216, 1218. The applications can also include any number of applications for controlling access to resources of the servers 1202, 1204, 1206.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1212, 1214, 1216, 1218. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1212, 1214, 1216, 1218. A database server can manage the HCM repository 112 (FIG. 1) or data retrieved by the engine 216 (FIG. 2).

The system 1200 may also include one or more databases 1220. In embodiments, the database 1220 may store the HCM repository 112 (FIG. 1) or data retrieved by the engine 216 (FIG. 2). The database(s) 1220 may reside in a variety of locations. By way of example, a database 1220 may reside on a storage medium local to (and/or resident in) one or more of the computers 1202, 1204, 1206, 1212, 1214, 1216, 1218. Alternatively, it may be remote from any or all of the computers 1202, 1204, 1206, 1212, 1214, 1216, 1218, and/or in communication (e.g., via the network 1210) with one or more of these. In a particular set of embodiments, the database 1220 may reside in a storage-area network ("SAN") familiar to those skilled in the art. Similarly, any necessary files for performing the functions attributed to the computers 1202, 1204, 1206, 1212, 1214, 1216, 1218 may be stored locally on the respective computer and/or remotely, as appropriate. In one set of embodiments, the database 1220 may be a relational database, such as Oracle 10g, that is adapted to store, update, and retrieve data in response to SQL-formatted commands.

Figure 13:
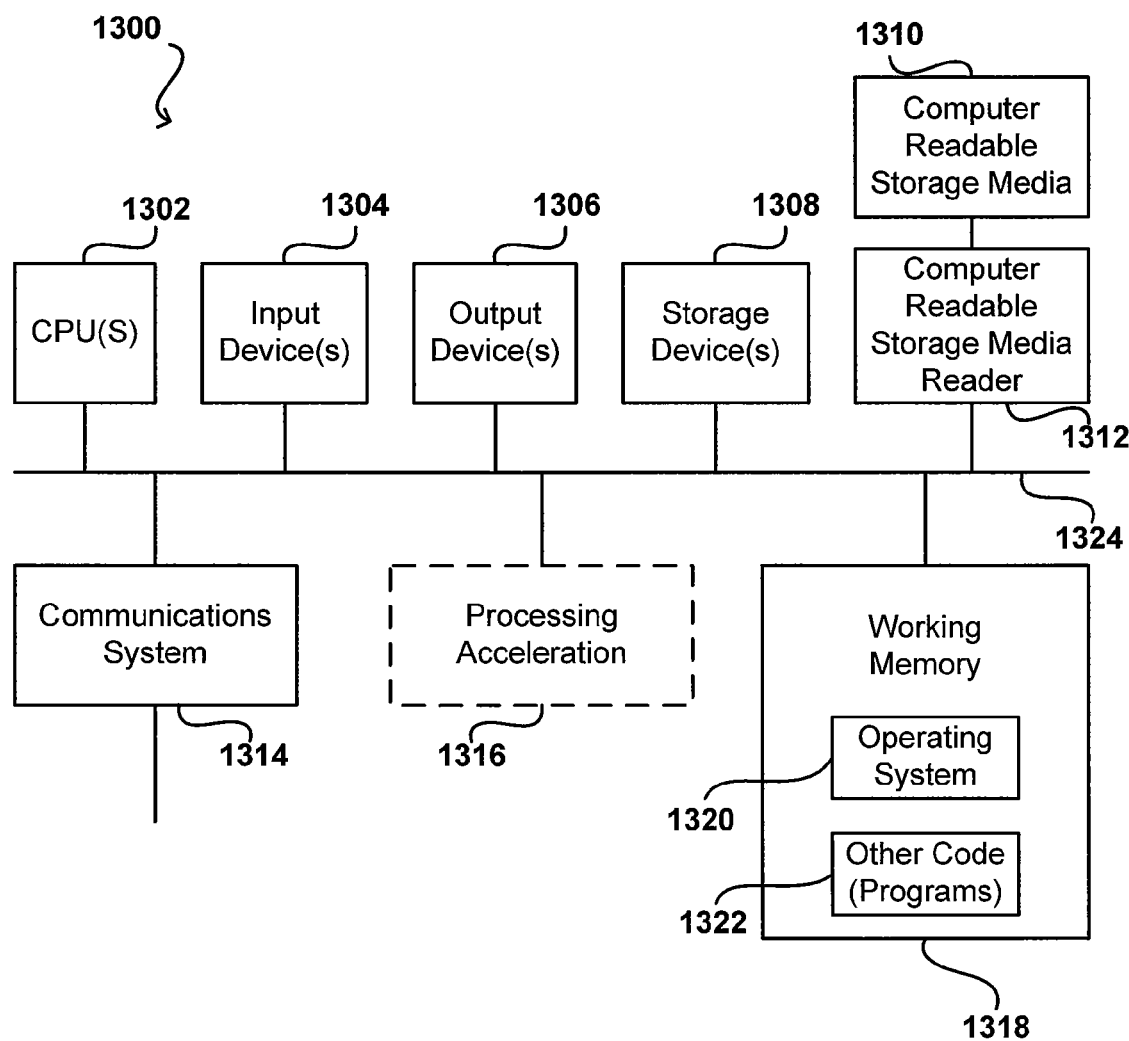
FIG. 13 is a block diagram of an embodiment of an exemplary computer system that can be used for the reporting system.

An exemplary computer system 1300 that may implement one or more components of the systems described herein is shown in FIG. 13. The system 1300 may be used to implement any of the computer systems described above, for example, the clients 106, 108, or 110 (FIG. 1), the HCM system 102 (FIG. 1), or the approval framework 116 (FIG. 1). The computer system 1300 is shown comprising hardware elements that may be electrically coupled via a bus 1324. The hardware elements may include one or more central processing units (CPUs) 1302, one or more input devices 1304 (e.g., a mouse, a keyboard, etc.), and one or more output devices 1306 (e.g., a display device, a printer, etc.). The computer system 1300 may also include one or more storage devices 1308. By way of example, the storage device(s) 1308 can include devices such as disk drives, optical storage devices, solid-state storage device such as a random access memory ("RAM") and/or a read-only memory ("ROM"), which can be programmable, flash-updateable and/or the like.

The computer system 1300 may additionally include a computer-readable storage media reader 1312, a communications system 1314 (e.g., a modem, a network card (wireless or wired), an infra-red communication device, etc.), and working memory 1318, which may include RAM and ROM devices as described above. In some embodiments, the computer system 1300 may also include a processing acceleration unit 1316, which can include a digital signal processor ("DSP"), a special-purpose processor, and/or the like.

The computer-readable storage media reader 1312 can further be connected to a computer-readable storage medium 1310, together (and, optionally, in combination with storage device(s) 1308) comprehensively representing remote, local, fixed, and/or removable storage devices plus storage media for temporarily and/or more permanently containing, storing, transmitting, and retrieving computer-readable information. The communications system 1314 may permit data to be exchanged with the network and/or any other computer described above with respect to the system 1300.

The computer system 1300 may also comprise software elements, shown as being currently located within a working memory 1318, including an operating system 1320 and/or other code 1322, such as an application program (which may be a client application, Web browser, mid-tier application, RDBMS, etc.). It should be appreciated that alternate embodiments of a computer system 1300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, executable in a computer system, for generating a report, comprising:
    retrieving data from two or more data sources, wherein the two or more data sources comprise at least a first data type and a second data type;
    a user interface operable to receive one or more parameters from a user;
    one or more databases store a data translation file;
    an approval workflow engine in communication with the one or more databases and a user interface operable to receive one or more parameters from a user:
    generating a structured data file for the retrieved data;
    sending the structured data and a first report template and a second report template to an XML publisher (XMLP) component, wherein the first report template and the second report template are independent from the first data type and second data type; and
    generating a first report based on the first data type and the first data template using the XMLP component and generating a second report based on the second data type and the second template using the XMLP component, wherein the first report is in a different format from the first report template and the second report is in a different format from the second report template;
    retrieving the data translation file from the one or more databases,
    and wherein the approval workflow engine is operable to translate one or more items of code data, in the retrieved data, into text data according to the data translation file;
    storing the text data in the structured data file;
    receiving commands from the approval workflow engine; and
    issuing the commands to the publishing component.

2. The method as defined in claim 1, further comprising:
    retrieving a data structure definition, wherein the data structure definition defines the structure of the structured data file; and
    retrieving the first and second report templates.

3. The method as defined in claim 1, further comprising:
    receiving user parameters relating to the first and second reports to be generated.

4. The method as defined in claim 1, further comprising:
    translating the data to text data where the data is code data.

5. The method as defined in claim 1, further comprising:
    writing transaction data to an audit history record for each processed transaction.

6. The method as defined in claim 2, wherein the first and second report templates are generated by a user and wherein the first and second report templates defines the structure of the first or second reports.

7. A system for generating a report, the system including a processor operable to execute instructions and a non-transitory data storage medium for storing the instructions, the processor retrieving instructions from the data store medium, the instruction causing the processor to perform a method, the instructions comprising:
    instructions for retrieving data from two or more data sources, wherein the two or more data sources comprise at least a first data type and a second data type;
    instructions for a user interface operable to receive one or more parameters from a user;
    instructions for one or more databases to store a data translation file;
    instructions for an approval workflow engine in communication with the one or more databases and a user interface operable to receive one or more parameters from a user;
    instructions for generating a structured data file for the retrieved data;
    instructions for sending the structured data and a first report template and a second report template to an XML publisher (XMLP) component, wherein the first report template and the second report template are independent from the first data type and second data type;
    instructions for generating a first report based on the first data type and the first data template using the XMLP component and generating a second report based on the second data type and the second template using the XMLP component, wherein the first report is in a different format from the first report template and the second report is in a different format from the second report template;
    instructions for retrieving the data translation file from the one or more databases, operable to translate one or more items of code data, in the retrieved data, into text data according to the data translation file;
    instructions for storing the text data in the structured data file;
    instructions for receiving commands from the approval workflow engine; and
    instructions for issuing the commands to the publishing component.

8. The system as defined in claim 7, further comprising:
    instructions for generating the first or second report template from user input, wherein the first or second report template is a text file; and
    instructions for generating the data definition file.

9. The system as defined in claim 7, further comprising:
    instructions for receiving user parameters associated with the first or second report.

10. The system as defined in claim 7, further comprising:
    instructions for generating a data translation file;
    instructions for retrieving the data translation file; and
    instructions for translating one or more items of retrieved data into text data according to the data translation file, wherein one or more items of retrieved data are code data; and
    instructions for storing the text data into the structured data file.

11. The system as defined in claim 7, further comprising:
    instructions for writing transaction data to an audit history record for each processed transaction.

12. A system for generating a report, comprising:
    one or more processors;
    one or more databases, the one or more databases operable to store a data definition file, a first and second report template, and two or more items of data, wherein the one or more databases store a data translation file;
    a user interface, the user interface operable to receive one or more parameters from a user;
    an approval workflow engine in communication with the one or more databases and the user interface, the approval workflow engine operable to retrieve data from two or more data sources, wherein the two or more data sources comprise at least a first data type and a second data type, generate a structured data file for the retrieved data, send the structured data and a first report template and a second report template to an XML publisher (XMLP) component, wherein the first report template and the second report template are independent from the first data type and second data type, generate a first report based on the first data type and the first data template using the XMLP component and generate a second report based on the second data type and the second template using the XMLP component, wherein the first report is in a different format from the first report template and the second report is in a different format from the second report template, retrieve the data translation file from the one or more databases, operable to translate one or more items of code data, in the retrieved data, into text data according to the data translation file, store the text data in the structured data file; and an application programming interface in communication with the approval workflow engine, the application programming interface operable to receive commands from the approval workflow engine and issue the commands to the publishing component.

13. The system as defined in claim 12, wherein the one or more user parameters determines the first or second report templates to be retrieved by the approval workflow engine.

14. The system as defined in claim 12, wherein the approval workflow engine is operable to generate the first or second report templates from the one or more user parameters and wherein the first or second report templates define the structure of the first or second report.

15. The system as defined in claim 12, wherein the publishing component is operable to generate the first or second report in one or more formats.

16. The system as defined in claim 12, wherein the structured data file is an XML file.

17. The system as defined in claim 15, wherein the first or second report formats are one of a group including a PDF format, an HTML format, a RTF format, or an XLS format.

18. The system as defined in claim 15, wherein the one or more user parameters define in which format the publishing component generates the first or second reports.

\* \* \* \* \*

UNITED STATES PATENT AND TRADEMARK OFFICE
CERTIFICATE OF CORRECTION

PATENT NO. : 7,945,601 B2  
APPLICATION NO. : 12/108231  
DATED : May 17, 2011  
INVENTOR(S) : Pallari et al.

Page 1 of 1

It is certified that error appears in the above-identified patent and that said Letters Patent is hereby corrected as shown below:

In column 9, line 7, delete "GRPS," and insert -- GPRS, --, therefor.

In column 11, line 22, in Claim 1, delete "user:" and insert -- user; --, therefor.

Signed and Sealed this
Eleventh Day of October, 2011

David J. Kappos
*Director of the United States Patent and Trademark Office*